United States Patent
Osten et al.

(10) Patent No.: US 10,481,020 B2
(45) Date of Patent: Nov. 19, 2019

(54) OPTICAL METHOD AND ARRANGEMENT FOR MEASURING RESIDUAL STRESSES, IN PARTICULAR IN COATED OBJECTS

(71) Applicant: Universität Stuttgart, Stuttgart (DE)

(72) Inventors: Wolfgang Osten, Stuttgart (DE); Giancarlo Pedrini, Stuttgart (DE); Rainer Gadow, Unterreit (DE); Klaus Körner, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 15/572,360

(22) PCT Filed: May 20, 2016

(86) PCT No.: PCT/EP2016/000847
§ 371 (c)(1),
(2) Date: Jan. 24, 2018

(87) PCT Pub. No.: WO2016/184578
PCT Pub. Date: Nov. 24, 2016

(65) Prior Publication Data
US 2018/0202872 A1    Jul. 19, 2018

(30) Foreign Application Priority Data

May 21, 2015   (DE) .................. 10 2015 006 697

(51) Int. Cl.
*G01L 1/00* (2006.01)
*G01L 1/06* (2006.01)
(Continued)

(52) U.S. Cl.
CPC ............... *G01L 1/06* (2013.01); *B05C 11/00* (2013.01); *B05D 1/00* (2013.01); *G01B 11/16* (2013.01); *G01B 11/24* (2013.01); *G01L 5/0047* (2013.01)

(58) Field of Classification Search
CPC ......... G01L 1/06; G01L 5/0047; B05C 11/00; B05D 1/00; G01B 11/16; G01B 11/24
(Continued)

(56) References Cited

U.S. PATENT DOCUMENTS

| 5,339,152 A | 8/1994 | Horn |
| 5,432,595 A | 7/1995 | Pechersky |

(Continued)

FOREIGN PATENT DOCUMENTS

| AU | 41472/89 A | 4/1990 |
| CN | 1055997 A | 11/1991 |

(Continued)

OTHER PUBLICATIONS

Nov. 11, 2017—(WO) International Preliminary Report on Patentability—App PCT/EP2016/000847.

(Continued)

*Primary Examiner* — Max H Noori
(74) *Attorney, Agent, or Firm* — Banner & Witcoff, Ltd.

(57) ABSTRACT

The present invention relates to a method and an apparatus for establishing residual stresses in objects, in particular in coated objects, and to a method and an apparatus for coating objects. The method comprises: impinging a surface (8) of the object (5) with laser light and generating a hole or a pattern of holes and/or locally heated points in the object (5); establishing the surface deformations by an optical deforming measuring method after the object (5) is impinged by laser light; establishing the residual stresses present in the object (5) from the measured surface deformations, wherein the generation of the hole pattern is carried out by an optical scanning apparatus which comprises an optical deflection and/or modulation arrangement for controllable deflection and/or modulation of the laser light, and/or a focusing arrangement for controllable focusing of the laser light.

16 Claims, 6 Drawing Sheets

(51) Int. Cl.
  *G01L 5/00* (2006.01)
  *B05C 11/00* (2006.01)
  *B05D 1/00* (2006.01)
  *G01B 11/16* (2006.01)
  *G01B 11/24* (2006.01)
  *G01L 11/00* (2006.01)

(58) Field of Classification Search
  USPC .......................................................... 73/800
  See application file for complete search history.

(56) References Cited

U.S. PATENT DOCUMENTS

| | | | |
|---|---|---|---|
| 5,920,017 | A | 7/1999 | Pechersky |
| 7,154,081 | B1 | 12/2006 | Friedersdorf et al. |
| 2001/0046033 | A1* | 11/2001 | Troyer .................. H04N 9/3129 |
| | | | 353/31 |
| 2003/0048494 | A1* | 3/2003 | Ayres ....................... G03H 1/04 |
| | | | 359/10 |
| 2006/0021409 | A1* | 2/2006 | Tenaglia .............. C21D 10/005 |
| | | | 72/53 |
| 2008/0123079 | A1 | 5/2008 | Numata et al. |
| 2015/0177126 | A1* | 6/2015 | Tamayo De Miguel .................... |
| | | | B82B 3/0085 |
| | | | 73/643 |
| 2017/0259375 | A1* | 9/2017 | Kumkar ............. G02B 27/0944 |
| 2017/0304114 | A1* | 10/2017 | Rathjen ................... A61F 9/008 |
| 2019/0096630 | A1* | 3/2019 | Kruit ..................... H01J 37/045 |

FOREIGN PATENT DOCUMENTS

| | | |
|---|---|---|
| CN | 101262115 A | 9/2008 |
| CN | 101477030 A | 7/2009 |
| CN | 101477031 A | 7/2009 |
| CN | 101804514 B | 10/2012 |
| DE | 4 026 132 A1 | 2/1992 |
| DE | 102009022571 A1 | 12/2011 |
| GB | 1380068 A | 1/1975 |
| GB | 2 508 335 A | 6/2014 |
| JP | S54-84972 A | 7/1979 |
| JP | S64-32134 A | 2/1989 |
| JP | H06-50734 A | 2/1994 |
| JP | H09-210888 A | 8/1997 |
| JP | H11-100801 A | 4/1999 |
| JP | 2004-170210 A | 6/2004 |
| JP | 2007-072165 A | 3/2007 |
| JP | 2007-148038 A | 6/2007 |
| JP | 2010-202735 A | 9/2010 |
| KR | 1020050064640 A | 6/2005 |
| WO | 2013/108208 A1 | 7/2013 |
| WO | 2014/013247 A2 | 1/2014 |

OTHER PUBLICATIONS

Sep. 12, 2016—(WO) International Search Report and Written Opinion—App PCT/EP2016/000847.

Rabung, M. et al.: "Nondestructive evaluation of the micro residual stresses of IIIrd order by using micro magnetic methods" (NDT & E International, vol. 63, 2014, pp. 7-10).

Fitzpatrick, M. E. et al.: "Determination of Residual Stresses by X-ray Diffraction—Issue 2" (Measurement Good Practice Guide No. 52, National Physical Laboratory, 2005).

ASTM International: Standard E 837-01 "Standard Test Method for Determining Residual Stresses by the Hole-Drilling Strain-Gage Method" (2015).

Wenzelburger, Martin et al.: "Methods and application of residual stress analysis on thermally sprayed coatings and layer composites" (Surface & Coatings Technology, 201 (5), 2006, pp. 1995-2001).

Schajer, G. S.: "Relaxation Methods for Measuring Residual Stresses: Techniques and Opportunities" (Experimental Mechanics, vol. 50, No. 8, 2010, pp. 1117-1127).

Viotti, Matías R. et al.: "Residual stress measurement using a radial in-plane speckle interferometer and laser annealing: preliminary results" (Optics and Lasers in Engineering, 42, 2004, pp. 71-84).

Baldi, A.: "Residual Stress Measurement Using Hole Drilling and Integrated Digital Image Correlation Techniques" (Experimental Mechanics, 54, 2014, pp. 379-391).

Korsunsky, Alexander M. et al.: "Residual stress evaluation at the micrometer scale: Analysis of thin coatings by FIB milling and digital image correlation" (Surface & Coatings Technology 205, 2010, pp. 2393-2403).

Matejicke, J. et al.: "In situ measurement of residual stresses and elastic moduli in thermal sprayed coatings. Part 1: apparatus and analysis" (Acta Materialia, vol. 51, No. 3, 2003, pp. 863-872).

Schajer, G. S.: "Advances in Hole-Drilling Residual Stress Measurements" (Experimental Mechanics, vol. 50, 2010, pp. 159-168).

Martínez-García, Venancio et al.: "Residual Stress Measurement with Laser-Optical and Mechanical Methods" (Advanced Materials Research, vol. 996, 2014, pp. 256-261).

* cited by examiner

OPTICAL METHOD AND ARRANGEMENT FOR MEASURING RESIDUAL STRESSES, IN PARTICULAR IN COATED OBJECTS

RELATED APPLICATIONS

The present application is a U.S. National Phase of International Application No. PCT/EP2016/000847, filed May 20, 2016, entitled "Optical method and arrangement for measuring residual stresses, in particular in coated objects" and designating the United States of America, and claims priority to German Patent Application No. 10 2015 006 697.8 filed May 21, 2015. This application claims priority to and the benefit of the above-identified applications, each of which is fully incorporated by reference herein in their entirety.

BACKGROUND

The present invention relates to a method and a device for determining residual stresses in objects, in particular in coated objects, and to a method and a device for coating objects.

Coatings are frequently used in order to ensure functional (e.g. in the case of corrosion or wear protection or in sensor technology) or decorative properties of an object surface. However, layers often have residual stresses caused by the production, which produce undesirable effects (e.g. layer spalling, crack formation). It is therefore of interest to know the residual stresses and their effects in the layer composite in order to carry out the layer production in a suitable manner.

A large number of techniques is known for determining residual stresses in layers and layer composite materials. Many methods, such as the use of beta emitters or the X-ray fluorescence technique, are mere laboratory measurement methods that are less suitable for industrial use. Techniques such as eddy current measurement methods, Barkhausen-Rauschen or inductive measurement methods can only be used for measurements on conductive or magnetic samples (cf. non-patent document [1]). Very high accuracies can be achieved with X-ray diffractometry. This method is based on the diffraction of X-ray radiation (determination of the Bragg angle), which is influenced by lattice distortions due to residual stresses. By X-ray diffractometry, residual stresses and the different proportions of the residual stresses of type I, II, and III (macro-, meso and microscopically) to the total residual stress state can be determined with a very high spatial resolution (cf. non-patent document [2]). However, these examinations are very time-consuming and therefore not suitable for measurements during a layer formation process.

Drilled hole or toroidal core methods can be used in a comparatively cost-effective manner. The drilled hole method (in the classic form or in the form of the micro-circular milling method) is a "minimally destructive" method that is often used in practice and represents the prior art in the practical application (cf. non-patent documents [3] to [5]). By drilling a hole, residual stresses are released, i.e. relaxed. This results in a resulting deformation (e.g. strain) of the surface. The measurement of the surface deformations (e.g. strains), in combination with suitable calibration functions (which have to be simulated for layer composites), allows the quantitative determination of the residual stresses. Residual stress depth profiles can be determined by incremental drilling or milling in small steps. The surface strains are traditionally measured using strain gauges (DMS). However, the use thereof is only possible on flat and relatively smooth surfaces. In addition to the practical disadvantage of the necessary direct application of the DMS to the test object, limitation to a measurement of two-dimensional (2D) deformations (lateral to the surface) is considered a further disadvantage. As in this case the measurement distance from the bore is always comparatively large, there are also limitations both with regard to the local resolution and to the practical applicability. Furthermore, these measurements are prone to errors with respect to asymmetries of the bore and the positioning of the DMS measuring grid rosette.

Instead of a bore, the residual stresses can also be released by local heating of the object surface (e.g. by a laser) (cf. non-patent document [6] and U.S. Pat. No. 5,920,017). If the material parameters and the heating or cooling cycles are known, the residual stresses can be inferred from the measured deformations.

Optical techniques allow a high-resolution areal detection of three-dimensional surface deformations and have therefore been used with various methods for determining residual stresses. Normally, these methods are based on classic holographic interferometry, speckle interferometry (electronic speckle pattern interferometry, ESPI) or digital holography. By evaluating the holograms/specklegrams, it is possible to determine the deformation of the surface after drilling. In connection with, for example, finite element simulations, the residual stresses can then be calculated (cf. non-patent document [5]). For measuring displacements, image correlation can be used as well (cf. non-patent document [7]).

The patent document AU 4147289A describes a camera-based holographic speckle interferometer, with which micro-deformations induced by stress (generation of mechanical tension) can be detected simultaneously and at different scales by combining different optical measurement methods. The degree of stress on the object is varied in this case.

The patent specification U.S. Pat. No. 5,339,152A discloses a movable interferometric arrangement, which is suitable for determining the residual stresses occurring in the event of a load varying over time in comparatively large, drilled holes for fastenings in a temporally resolved manner. The arrangement is particularly suitable for use in aircraft construction.

The patent specification JP 2004-170210 A describes a method for determining stresses by measuring the deformation of a drilled hole. In this case, a miniaturized laser distance sensor is used.

The patent specification U.S. Pat. No. 7,154,081 B1 describes an optical measuring system for the temporally resolved measurement of residual stresses on coatings, for example on insulator layers for electrical conductors. The optical measurement system comprises a plurality of spatially distributed optical fiber sensors, wherein Bragg gratings are used. A disadvantage of this measurement system is the low spatial resolution. Furthermore, it is not suitable for production processes having a high material throughput.

The non-patent document [8] describes a method for determining residual stresses at the micrometer scale, which is based on the measurement of deformations produced by incrementally drilling nano-holes (diameter 50 nm) using focused ion beam (FIB). The deformations are measured by a scanning electron microscope (SEM) using image correlation methods.

The patent application WO 2013-108208 (A1) describes another method for detecting residual stresses in surface coatings at the micrometer scale. To this end, two pairs of strips of the material are removed from the surface by electron or ion beam removal techniques. The lateral displacements resulting from the exposed residual stresses are measured by digital image correlation on the basis of SEM images (SEM: scanning electron microscope). However, the use of scanning electron microscopy does not allow a rapid measurement of the residual stresses of surface coatings in a production process having a high material throughput, since scanning electron microscopes usually operate in a vacuum.

Layers having residual stresses are partially produced by thermokinetic coating ("thermal spraying"). Thermokinetically deposited layers have inhomogeneities, porosities, and multi-phase structures, wherein the original molten spray particles partially form pronounced textured layers. They are anisotropic and therefore differ significantly from the corresponding solid materials in terms of their properties. Furthermore, with regard to their application properties (load-bearing capacity, reliability), they are strongly influenced by their residual stress states after layer application and finishing, which in turn depends on the material properties of the layer composite partners involved and on the process parameters.

Non-Patent Documents

[1] M. Rabung, I. Altpeter, C. Boller, G. Dobmann, H. G. Herrmann, "Non-destructive evaluation of the micro residual stresses of IIIrd order by using micro magnetic methods", NDT & E International, Volume 63, April 2014, Pages 7-10

[2] M. E. Fitzpatrick, A. T. Fry, P. Holdway, F. A. Kandil, J. Shackleton and L. Suominen, "Determination of Residual Stresses by X-ray Diffraction—Issue 2", Measurement Good Practice Guide No. 52, National Physical laboratory.

[3] ASTM Standard E 837-01, "Standard Test Method for Determining Residual Stresses by the Hole-Drilling Strain-Gage Method"

[4] M. Wenzelburger, D. López, R. Gadow, "Methods and application of residual stress analysis on thermally sprayed coatings and layer composites", Surf. Coat. Technol., 201 (5), 1995-2001, 2006.

[5] G. S. Schajer, "Relaxation Methods for Measuring Residual Stresses: Techniques and Opportunities", Experimental Mechanics, 1117-1127, 2010

[6] M. Viotti, R. Suterio, A. Albertazzi, G. Kaufmann, "Residual stress measurement using a radial in-plane speckle interferometer and laser annealing: preliminary results", Optics and Laser in Engineering, 42, pp 71-84, 2004

[7] A. Baldi, "Residual Stress Measurement Using Hole Drilling and Integrated Digital Image Correlation Techniques", Experimental Mechanics (2014) 54:379-391.

[8] A. M. Korsunsky, M. Sebastiani, E. Bemporad, "Residual stress evaluation at the micrometer scale: Analysis of thin coatings by FIB milling and digital image correlation", Surface & Coatings Technology 205 (2010) 2393-2403

[9] J. Matejicek, S. Sampath, "In situ measurement of residual stresses and elastic moduli in thermal sprayed coatings. Part 1: apparatus and analysis", Acta Mater., Vol. 51, Nr. 3, 863-872, 2003 Previous works for residual stress control during thermal spray processes have mainly concentrated on the measurement of the resulting residual stresses, for example on the time and layer-thickness-dependent profile of the residual stresses in the process using geometrically simplified reference samples (cf. non-patent document [9]) or on the determination of the residual stress state after the coating process in real component surfaces by measuring residual stress depth profiles, for example on the basis of the drilled hole method or X-ray diffraction. Furthermore, there is a large number of theoretical and numerical examinations with regard to the influence of the material properties as well as the process parameters and of the substrate pretreatment.

The previously developed systems for determining residual stresses do not allow a time and spatially resolved examination during a production process, for example during a coating process. The measurement methods based on drilling are minimally invasive, but are carried out using a high-speed milling cutter. This is time-consuming and requires mechanical contact with the surface of the object. Furthermore, the created drilled holes must generally be closed again at a later time in a complex manner. Furthermore, a combination of experimental 3D deformation data with model-based simulation calculations is not carried out, but only 2D deformations are determined with DMS and correlated with the triggering residual stresses via simulated calibration functions.

It is an object of the present invention to enable a temporally and spatially highly resolved determination of residual stresses, in particular in the surfaces of coated objects, by contactless measurement methods. A further object is to enable an in-process detection (for example during a coating process) of residual stresses.

This/These object(s) is/are solved by a method and a device for detecting residual stresses of an object, in particular a coated object, and by a method and a device for coating an object with the features specified in the independent claims.

A first aspect of the invention relates to a method for determining residual stresses of an object, preferably of a coated object. The method comprises applying laser light to a surface of the examined object and producing a hole or a pattern of holes and/or locally heated points in the object;

determining the surface deformations after the application of the laser light to the object by an optical deformation measurement method;

determining the residual stresses present in the object from the measured surface deformations.

A second aspect of the invention relates to a device for determining residual stresses in an object, preferably in a coated object. The device comprises:

a laser exposure system having at least one laser and an optical scanning device for applying laser light to a surface of the object and producing a hole or a pattern of holes and/or locally heated points in the object;

an optical measuring system for determining the deformation of the surface of the object with the generated pattern.

The application of laser light to the object and the creation of the hole or pattern are carried out by an optical scanning device. The optical scanning device comprises an optical deflection and/or modulation arrangement for controllable deflection and/or modulation of the laser light (for example by reflection, refraction and/or light diffraction) and/or a focusing arrangement for controllably focusing the laser light on the surface of the object (i.e. a focusing arrangement with a controllable focus).

A third aspect relates to a method for coating an object. The method comprises the steps of:

applying a sublayer to at least a part of the surface of the object;

determining the residual stresses in the partially coated object according to the method for determining residual stresses according to one aspect of the invention; and controlling at least one of the parameters of the coating method on the basis of the determined residual stresses.

A fourth aspect relates to a device for coating an object, comprising:

a coating arrangement for applying a sublayer to at least a part of the surface of the object;

a device for determining residual stresses according to one aspect of the invention; and a control arrangement for controlling at least one of the parameters of the coating method on the basis of the determined residual stresses.

The parameters of the coating method, which can be controlled or varied on the basis of the determined residual stresses, may in particular comprise:

the temperature of the substrate or heating or cooling of the substrate (usually by air cooling); and/or the application rate and/or temperature of the coating material; and/or the movement speed of the coating arm (kinematics); and/or the layer thickness; and/or the particle distribution; and/or the particle size.

The coating method may be a thermal, mechanical, thermomechanical or thermokinetic or chemical method, for example a high-speed flame spraying method, a plasma method, etc.

According to the invention, it is suggested that a laser (e.g. a pulsed laser) be applied to the (e.g. coated) surface of the examined object. In this case, a part of the top layer of the object (e.g. a part of the coating of a coated object) is locally removed and/or heated in order to achieve a deformation of the surface by relaxation of residual stresses. The two or three-dimensional surface deformations are measured by optical deformation measurement methods. The optical deformation measurement methods or the optical measuring systems for determining surface deformations are based e.g. on digital holography, speckle correlation technology, speckle interferometry, image correlation technique or on other known optical measurement methods. From the optically measured deformations (for example by recorded holograms, shearograms, specklegrams, images for image correlation, etc.) and optionally further data relating to the surface after the laser application and/or the material of the object and/or the object coating, the residual stresses present in the object and in particular in the coating of a coated object can be determined numerically. The data relating to the surface after laser application may in particular comprise the geometry (shape and/or depth) of the created hole and/or the position and/or topography of the generated pattern, shape of the object or of the examined surface. For determining the residual stresses, for example, continuum-mechanical calculations can be carried out, wherein defined residual stress states are specified by finite element models. The numerical methods used are known from the prior art.

The light beam generated by the laser is controllably deflected, modulated and/or focused on the object, wherein the control preferably takes place in video real time. Thus, it is possible to locally remove and/or heat a part of the surface layer of the object in a targeted manner, even in the event that the object to be examined is noticeably uneven, i.e. strongly curved.

The use of a laser for straining the examined object or coating of the object in combination with controllable optical deflection, modulation and/or focusing and with optical surface deformation measurement methods allows a fast, precise and contactless determination of residual stresses within coatings and layer systems. The objects to be examined may be formed three-dimensionally and have a complex shape. Thus, the surface of the object can both have a regular surface (for example a spherical, cylindrical or conical surface) or be a free-form surface. Further, the laser radiation can be used at locations that are difficult to access for drilling and/or local heating. Furthermore, the measurement method is minimally invasive, since the creation of smallest holes and/or locally heated points is possible with high precision and positional accuracy. Furthermore, it is possible to change the laser power, the geometry of the created holes and/or heated points and/or the shape or topography of the generated pattern quickly and precisely and to adapt it to the examined objects. Thus, residual stresses can be determined e.g. during a coating process (in-line) and with high spatial resolution (quasi-real-time measurement method). The method and the device for determining residual stresses thus enable a high measurement and evaluation speed, reliability as well as high scalability and high flexibility.

Further advantages of the method according to the invention include:

freely selectable flexible arrangement or position of complex patterns on the surface of the examined object;

real-time capable, field-by-field evaluation of the residual stress states of extended surfaces with freely selectable adjustable distribution (local high-resolution) of the holes and/or locally heated points and design of the hole geometry or the geometry of the locally heated point;

high precision of the arrangement and form of the created holes and/or locally heated points; and adaptive with regard to the arrangement, density, geometry and/or depth of the individual holes or locally heated points;

high sensitivity and precision.

The inventive method and the inventive device for the contactless and rapid determination of residual stresses by laser exposure can be integrated into a production process (for example into a coating process), in particular into a high-speed process in a simple manner. One or more parameters of the production or coating process can be controlled on the basis of the determined residual stresses. The process parameters can also be controlled locally, on the basis of the residual stresses, which are preferably determined in parallel, at different spatial positions on the surface of the object, with a comparatively high spatial resolution. As a result, for example, the quality of the coating of an object can be improved considerably. Since the laser power and beam quality as well as the parameters of the scanning system can be set and controlled with high accuracy and precision, the stability of the production process (for example of the coating process) can be ensured.

Preferably, the inventive method and the inventive device for the contactless and rapid determination of residual stresses by laser exposure are integrated into coating process, for example into a coating process by thermal spraying. Due to the flexible in-process measurement of the residual stresses (parallel and in virtually freely selectable topology and spatial and temporal resolution) the process control can be improved.

In particular, the coating of workpieces of almost any type with methods of thermal spraying involves an intensive heat and mass transfer and an intensive pulse exchange, for example with hard material particles during the pretreatment of the surfaces. Due to the mechanical, thermal and chemical interaction (here, above all, latent heat transfer phenomena), depending on the thermo-physical material properties of layer and substrate on the one hand and the dynamics of the above-mentioned heat and mass transfer processes on the other hand, process-related residual stresses form in the workpiece or its edge zone(s). Since these residual stresses have to be considered and evaluated in a spatially resolved manner, the tracking of the burners or their trajectories is directly responsible for the formation of the residual stresses.

Traditionally, it was only possible to determine the residual stress distribution and the spatial profile thereof by larger series of microscopically destructive tests on the cooled component, i.e. with a considerable delay regarding the genesis of the residual stresses. The inertia of the traditional measurement method of surface tension relaxation (tactilely measured by highly sensitive strain gauges in rosette arrangement) may be less critical in terms of time for many applications, but it means a frequently minimally invasive destruction of the finished surface.

A measurement of the residual stresses during a coating process and an adaptation of the process parameters on the basis of the measured residual stresses are not known from the prior art.

The inventive method and the inventive device for the contactless and rapid determination of residual stresses by laser exposure enable a rapid, minimally invasive measurement of residual stresses with high local resolution during an ongoing coating process. The determined residual stresses are used for locally controlling the process parameters with a comparatively high local resolution in a targeted manner. Thus, for example, the temperature control can be controlled by simultaneous cooling or heating, both with locally defined resolution methods. Furthermore, the trajectory planning and implementation can be directly adapted to the heat profile. Preferably, compiling or amalgamating of the geometry data of the workpiece from CAD data with the trajectories during the coating process is carried out.

One advantage of the proposed method is the real-time of the residual stress determination during the ongoing coating (real-time/in-process) by contactless and non-destructive online measurement using optical measurement methods. The local resolution capacity of the optical measurement methods is very high and can be selected freely. The topology of a surface increment can be determined and evaluated quickly in such a way that the coating process can be varied and updated directly. In this way, an improved or specifically adjusted residual stress-dependent coating result can be achieved. Moreover, the coating process does not have to be interrupted and readjusted. Direct real component geometries and surface morphologies can be created.

The pattern of holes and/or locally heated points can be created sequentially or in parallel point by point. Preferably, the pattern is generated not sequentially (such as in the mechanical case), but in parallel (simultaneously) point by point, for example by a spatial light modulator. Thus, a whole series, matrix or even several matrices of holes and/or locally heated points, preferably with adaptive distribution and/or defined hole geometry can be produced simultaneously.

The hole produced by laser irradiation and the locally heated point may have different geometries (shape and/or depth), which can be locally variable. For example, the hole or the locally heated point can have a circular, elliptical, dash-shaped or another more complex shape. Preferably, the hole and/or the locally heated point penetrates only the surface of the examined object, for example only a part of the coating of a coated object.

The generated patterns of holes or locally heated points may also be different. For example, the pattern may comprise a circle or a plurality of concentric circles, a spiral (e.g. archimedean), a rosette, a row or a matrix, a slit or cross or another more complex shape. The distribution of the holes and/or the locally heated points within the pattern may be homogeneous or inhomogeneous.

The patterns can be selected depending on the topography of the examined surface and the expected or assumed residual stresses and/or their gradients. Accordingly, the method can comprise adjusting or adapting the geometry of the individual holes and/or locally heated points and/or the shape or the topography of the generated pattern (for example the distribution of the holes and/or of the locally heated points) and/or the position and/or arrangement of the generated pattern on the surface of the examined object to the topography of the surface of the examined object and/or or to the expected residual stresses and/or their gradients in the examined object or in the examined surface. Thus, by the controllable optical deflection and/or modulation arrangement and/or focusing arrangement, different patterns with different topographies and/or geometries of the drilled holes or locally heated points can be projected and applied or inscribed to the different objects. It is also possible to position or center the created drilled hole or pattern at an assumed or very probable location of high residual stresses in a targeted manner. This is generally a location of large local curvature of the surface. As a result of the course of the production process or coating process, however, large residual stresses can occur at locations that do not correspond to the locations of a large or largest local curvature of the surface. In this case, the created drilled hole or pattern can be positioned at such locations of expected high residual stresses.

For example, the pattern can have a plurality of lines (preferably at least three lines, which are arranged e.g. in a grid), which are inscribed in or applied to the surface of the examined object. The surface may be a ruled surface or a free-form surface (also in combinations). The lines of the pattern may be at least approximately perpendicular to the direction of the largest local curvature(s) of the surface.

The pattern can further comprise spirals, for example archimedean spirals, or concentric circles. Such a pattern is particularly suitable for determining residual stresses in objects the surface of which can be approximated by a sphere. Preferably, the center of these structures is set to a presumed or very probable location of high residual stresses. This is generally a location of large or largest local curvature of the surface.

If the surface of the examined object is a surface in which a surface element can be approximated by a cylinder, a grid can be applied as a pattern, in which the grid lines are preferably arranged substantially parallel to the cylinder axis. It is advantageous for the spatial frequency of the grid to be comparatively high, preferably at least about 5 line pairs/mm, even more preferably at least about 10 line pairs/mm. Furthermore, it is advantageous for the scanning ratio (gap-grid web lengths) to approach 1. The double gap width, but not 10 times the gap width in relation to the web width is preferred.

The distribution of the individual holes and/or heated points within the pattern may be homogeneous or inhomogeneous. For example, the grid constant can vary in the case of a pattern of dashes or lines. The distribution of the holes and/or heated points to the edges of a surface may e.g. be another than in the area following or being orthogonal to the edge.

Due to the adaptive geometry and/or distribution of the individual holes and/or heated points (i.e. due to the adaptive pattern), it is possible to carry out a measurement reliably and efficiently even on noticeably uneven and strongly curved coated objects. Furthermore, it is possible to change the strain on the examined object in-line, for example during a coating or production process.

Multiple measurement when using a pattern can further improve the results of both the in-plane surface deformation measurements and the out-of-plane surface deformation measurements, since an averaging effect occurs. Consequently, the signal-to-noise ratio is improved by parallelization.

The pattern can preferably be generated holographically by a controllable spatial light modulator, preferably in video real time. The controllable light modulator may be an electro-optical light modulator (such as a liquid crystal light modulator), an acousto-optical modulator (AOM) or a digital micromirror system (DMD light modulator, wherein DMD stands for "digital micro mirror device"). Alternatively or in addition, opto-mechanical devices such as a rotating wedge plate, mirror, prisms, etc. can be used for deflecting the laser light. Accordingly, the optical deflection and/or modulation arrangement may be a controllable light modulator (for example a liquid crystal light modulator, a DMD light modulator or acousto-optical modulator) or a rotating wedge plate.

The focusing arrangement may comprise a lens, an objective, a mirror objective and/or other optical elements. The focusing arrangement preferably has a computer-controlled focusing function. Thus, the depth and/or shape of the created hole can be varied and, for example, be adapted to the examined coating and/or geometry of the object.

Preferably, the hole and/or the pattern are produced using the same laser that is used to determine the surface deformations. In other words, a laser serves as a light source for the laser exposure system and for the optical measuring system for determining the deformation of the surface of the object. The device for measuring residual stresses can thus be realized in a simpler, more compact and more cost-effective manner.

The method can further comprise detecting, by an optical three-dimensional (3D) measuring arrangement, two or three-dimensional data relating to:
  the geometry of individual holes and/or pattern elements or structures; and/or the spatial position of individual holes and/or pattern elements or structures on the surface of the object; and/or
  the topography of the pattern; and/or
  the positioning of the pattern on the surface of the object; and/or
  the shape of the object and/or the surface of the object.

The 3D data thus obtained can be used for the supply of input data for the creation of the residual stress model. The optical 3D measuring arrangement may be a confocal microscope, an optical system, based on stripe projection, on digital holography, for example the latter being based on the two-wavelength method. The optical 3D measuring arrangement may be part of the device for measuring residual stresses.

Fields of use and applications of the inventive solution of the optical method and of the device for determining residual stresses, in particular on coated surfaces, include:
  material sciences,
  production monitoring, for example in coating systems,
  safety-relevant applications, for example in aircraft construction.

In particular, the method according to the invention and the device according to the invention are suitable for determining residual stresses in the coating of coated objects. The coating may have a thickness of, in particular, 10 micrometers up to 500 micrometers. The coating may comprise one or more layers.

BRIEF DESCRIPTION OF THE DRAWINGS

Further objects, features, and advantages of the present invention will become apparent from a detailed description of preferred embodiments of the present invention with reference to the following drawings, which show.

The terms measuring radiation, exposure radiation, and light as used in the context of the present application relate to electromagnetic radiation from the deep UV via the VIS, NIR, MIR, FIR to the terahertz range.

DETAILED DESCRIPTION

Figure 1:
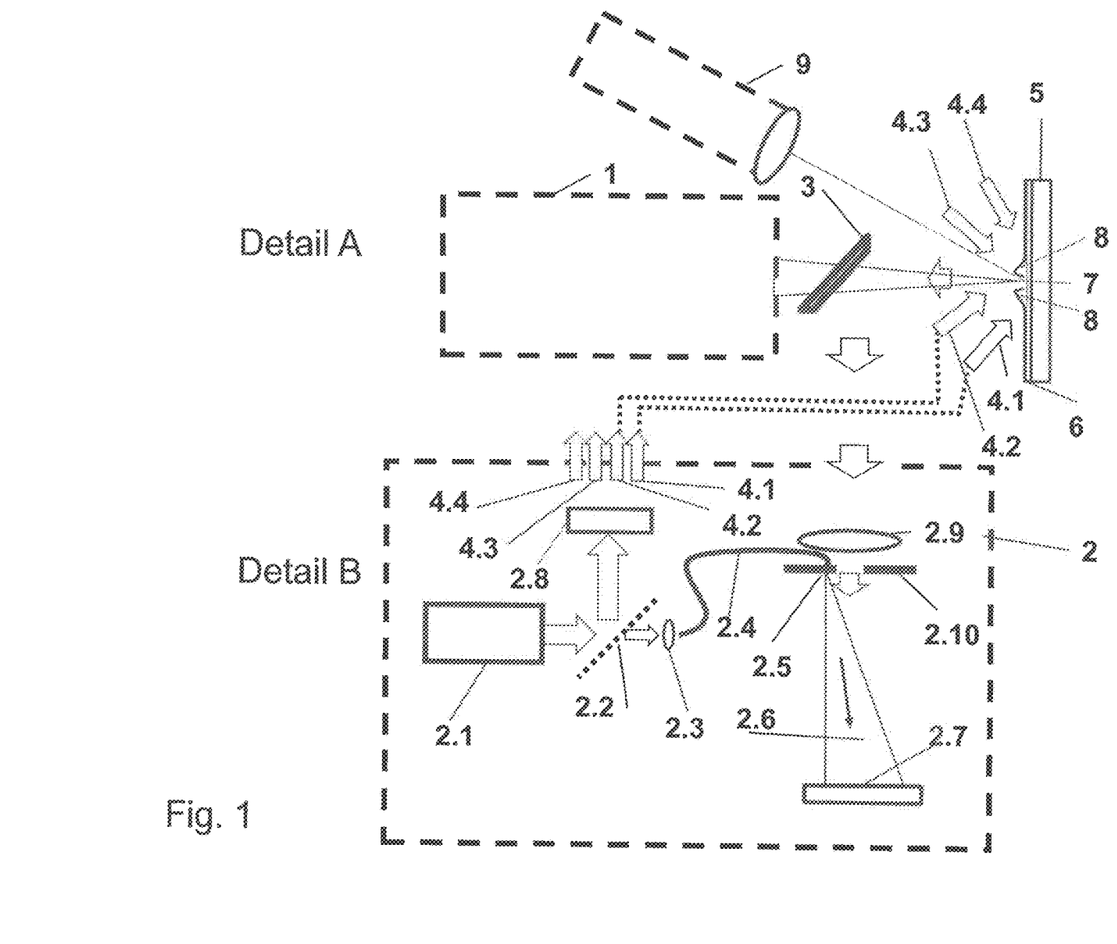
FIG. 1 an exemplary device for measuring residual stresses in coated objects.

FIG. 1 shows an exemplary device for measuring residual stresses in coated objects. The device comprises an arrangement for exposing a coated object 5 (detail A) and an optical measuring system for measuring 3D deformations or 3D surface deformations, which are created by the exposure of the coated object (detail B).

The object may be an arbitrary coated object, including a strongly curved object. Non-limiting examples include coatings for corrosion protection, protective layers for electrical insulation and/or the thermal protection. The coating may have a thickness in the range of 10 micrometers to 500 micrometers. The number and the arrangement of the layers in the coating may vary.

Figure 2:
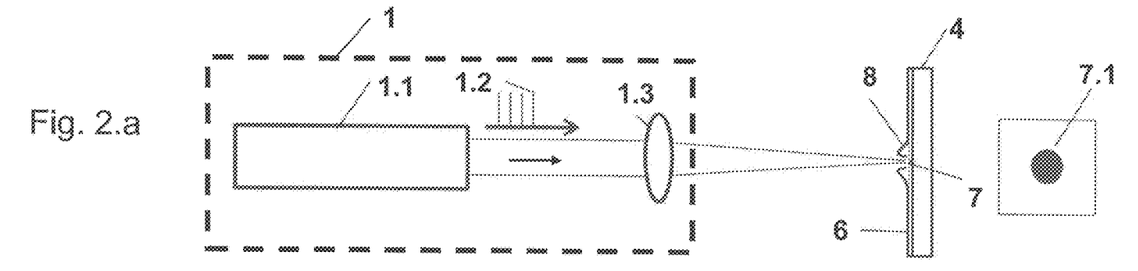
FIG. 2 exemplary exposure arrangements.

Different exposure arrangements (laser exposure systems) can be used for the exposure of the coated object 5. Three exemplary exposure arrangements are shown in FIGS. 2a, 2b and 2c. FIG. 2.a shows an exemplary exposure arrangement with a simple construction. The exposure arrangement comprises a pulse laser 1.1, which emits a sequence of short laser pulses 1.2. This may be both in the pico and in the micro-seconds range, in the embodiment here with pulse lengths in the 10-nanosecond range. The exposure radiation emitted by the pulse laser 1.1 is focused onto the object 5 having a coating 6 by a lens 1.3. The color filter 3, shown in FIG. 1, detail A, transmits the light for exposure. The power of the laser pulses 1.2 of the pulsed laser 1.1 may be suitably selected depending on the object and/or coating being examined. The intensity density on the surface 8 of the object 5 may be at least $10^8$ W/cm$^2$, so that material is removed from the surface 8 of the object 5 and a hole 7 having a circular shape 7.1 is formed.

FIG. 2.*b* shows an exemplary exposure arrangement with a rotating wedge plate 1.4. The wedge plate 1.4 changes the laser beam direction by its rotation. With a rotating wedge plate 1.4, a sequence of laser pulses 1.2 reaches this wedge plate 1.4. Here, each pulse is focused onto another point of the surface 8 of the object 5 by the lens 1.3. This allows material to be removed along a fine circular-ring-shaped line 7.2.

FIG. 2.*c* shows an exemplary exposure arrangement, in which the light beam is first reflected by a mirror 1.5 in the direction of a spatial light modulator 1.6. Two-dimensional (2D) patterns in the form of holograms, i.e. light-diffracting gratings, are inscribed into the spatial light modulator 1.6. These holograms can be selected within broad limits, so that the incident light beam, as a result of the diffraction, forms a desired pattern 7.3 with an almost arbitrarily programmable form, for example in the form of a ring, in the form of an "X", in the form of a cross or also in the form of a double cross ("#"), and with a depth, which can be selected within broad limits, on the surface 8 of the object 5. If the laser power is sufficiently high per object surface area, material can also be removed at different points at the same time on the surface 8 of the object 5. On the one hand, the lens 1.3 in FIG. 2.*c* allows focusing of the diffracted laser beam onto the surface 8 of the object 5. On the other hand, however, focusing may also be created by the spatial light modulator 1.6 itself. In this case, the lens 1.3 is not necessary. The removal of material from the surface 8 of the object 5 creates a three-dimensional (3D) deformation of the surface 8 in the immediate vicinity of the hole 7.

Detail B of FIG. 1 shows an exemplary optical measuring system 2 for measuring the surface deformation, which is based on digital holography. A laser 2.1 emits a laser beam of rays that is divided into two partial beams of rays by the first beam splitter 2.2. One partial beam of rays is coupled into an optical monomode fiber 2.4 by the lens 2.3. The light is guided through the monomode fiber 2.4 and the output of the monomode fiber 2.4 opens into a small hole 2.5, so that the light, which in this case represents the reference beam or rays 2.6 for the holographic measuring arrangement, reaches a CCD or CMOS detector 2.7.

The other partial beam of rays from the first beam splitter 2.2 is split again into at least 3 partial light beams of rays by the second beam splitter 2.8. FIG. 1 shows four partial light beams of rays 4.1, 4.2, 4.3 and 4.4. These partial light beams of rays 4.1, 4.2, 4.3 and 4.4 illuminate the surface 8 of the object 5 from at least three independent directions. This illumination can be carried out simultaneously with all partial light beams of rays 4.1, 4.2, 4.3 and 4.4 or also one after the other. The light scattered from the surface 8 of the object 5 is reflected by the color filter 3 in the direction of the measuring system 1. The lens 2.9 images the surface 8 of the object 5 onto the detector 2.7. The aperture stop 2.10 determines the lateral resolution of the imaging system. The light scattered from the surface 8 of the object 5 interferes with the reference beam of rays 2.6. The interference pattern is recorded by the detector (2.7) and then represents a digital hologram. Prior to the exposure of the object 5, several holograms with different illuminations from at least three independent directions are registered. After the exposure, further holograms with different illuminations are registered. After evaluation of the holograms, the 3D deformation between the non-exposed and the exposed state is determined. This process can be repeated, so that different exposure states are created and thus the 3D deformation is determined as a function of the exposure.

The geometry (depth, shape) of the hole formed by the laser exposure and/or the topography of the resulting pattern is measured by a measuring arrangement for the 3D shape 9. Said measuring arrangement may be a confocal microscope or a system based on stripe projection or digital holography, the latter being based on the two-wavelength method, for example.

The 3D deformation in connection with the measurement of the geometry (depth, shape) of the holes and/or the topography or depth profile of the pattern, which arise as a result of the laser exposure, and material parameters of the object 5 and the coating 6 are evaluated and the residual stresses present in the coating are determined, for example by a finite element method. Further methods for determining the residual stresses are known from the prior art.

Figure 3:
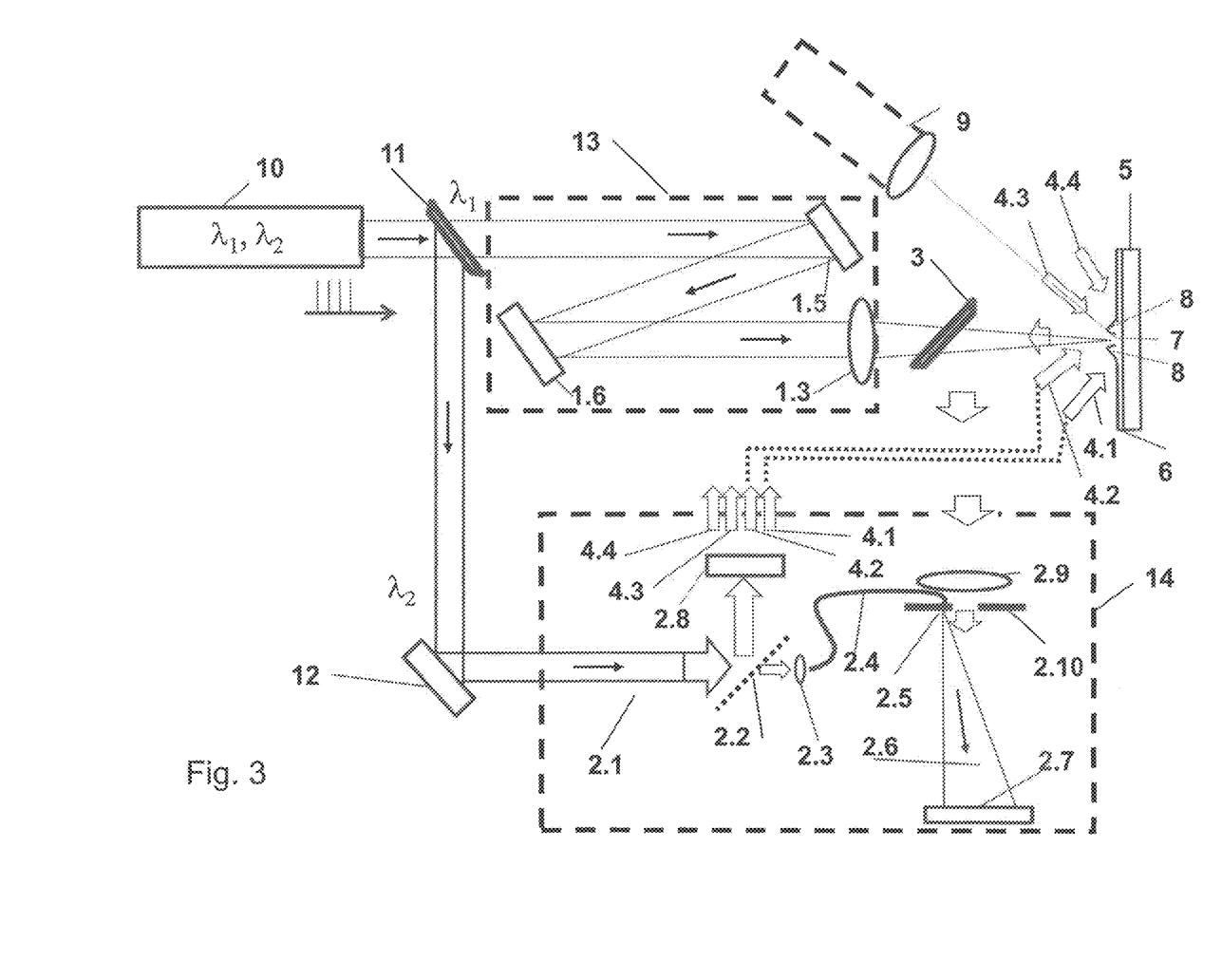
FIG. 3 a further exemplary device for measuring residual stresses in coated objects.

FIG. 3 shows an exemplary device for measuring residual stresses in coated objects, in which a pulsed laser having two wavelengths (10), $\lambda_1$ and $\lambda_2$, is used both for exposure of the object and for optical measurement. The color splitter 2 reflects the beam with the wavelength $\lambda_2$ and transmits the beam with the wavelengths $\lambda_1$. The beam with the wavelength $\lambda_1$ is used for the laser exposure system 13. The beam with the wavelength $\lambda_2$ is used for the optical measuring system 14.

Figure 4:
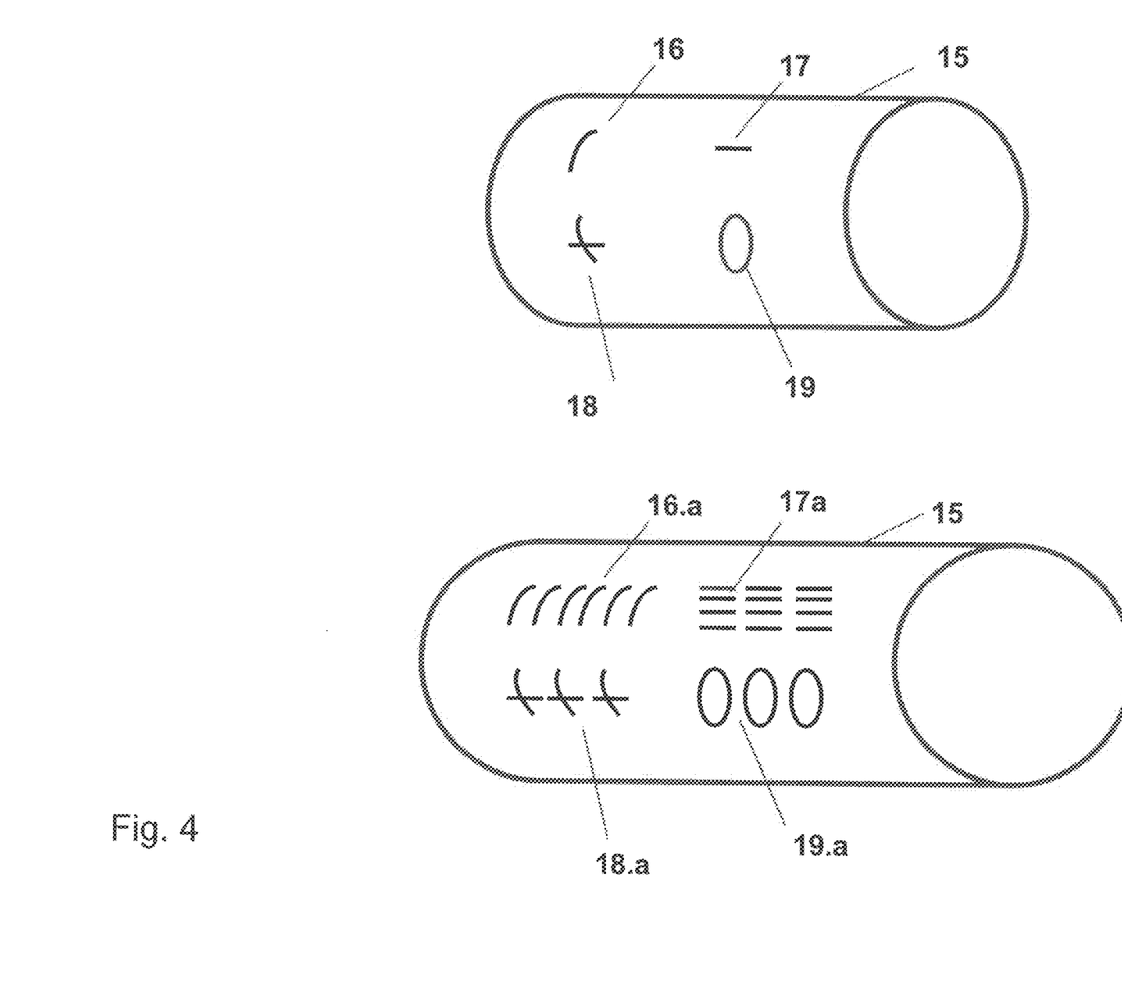
FIG. 4 exemplary patterns on a coated cylindrical surface.
Figure 5:
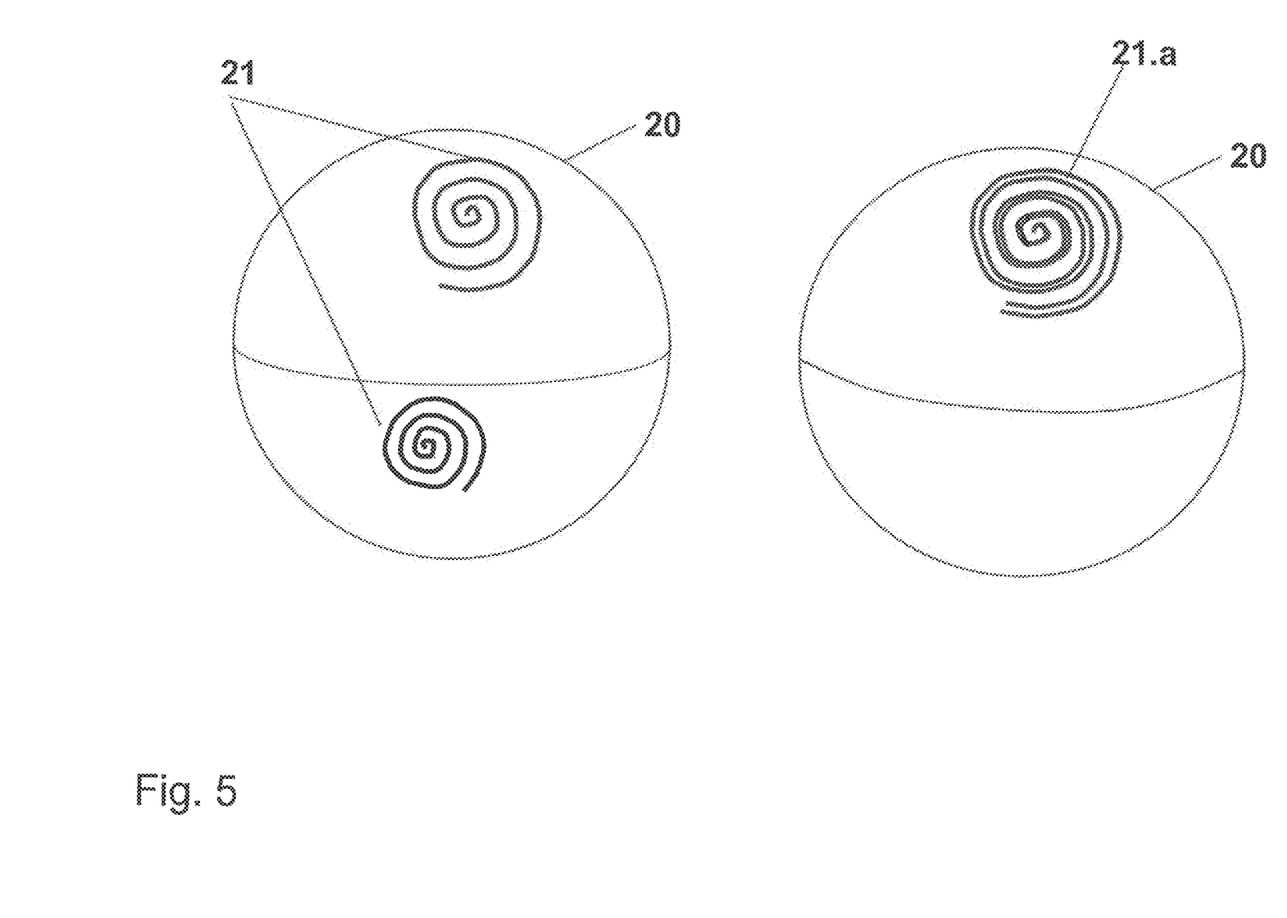
FIG. 5 exemplary patterns on a coated spherical surface.
Figure 6:
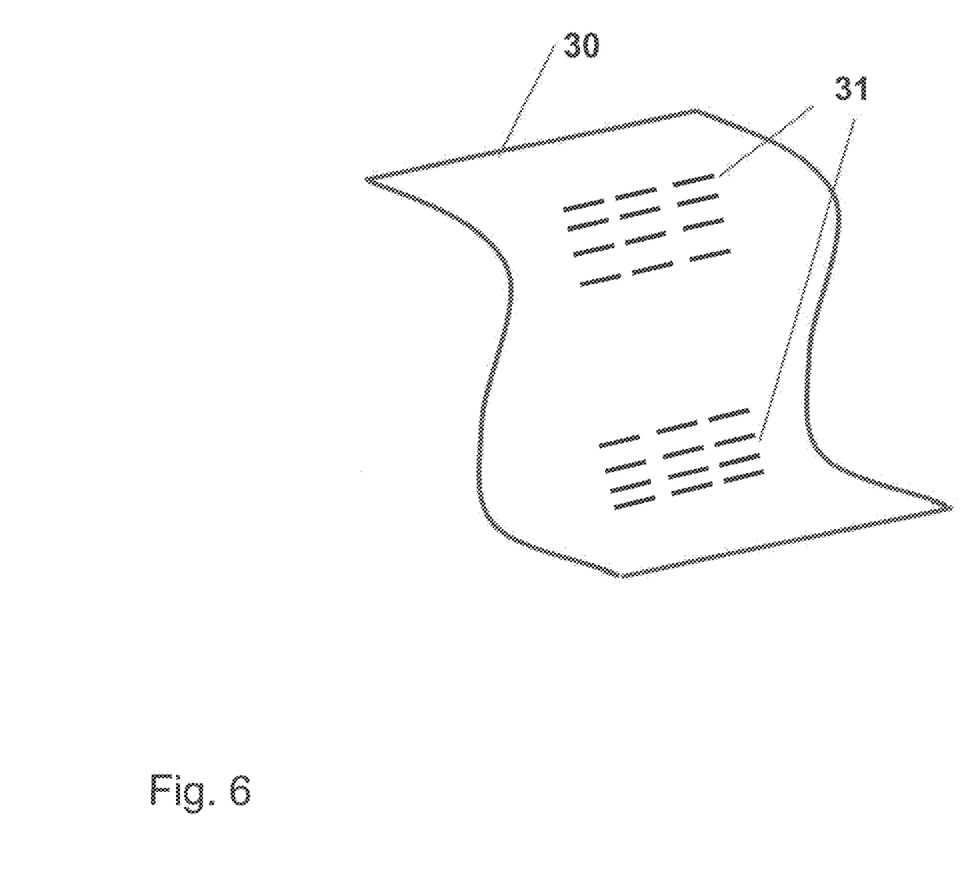
FIG. 6 exemplary patterns on a coated freeform surface.

FIG. 4 shows a coated cylindrical surface 15 onto which line patterns (radial 16, axial 17), cross patterns 18 and/or elliptical or ring-shaped patterns 19 for the local removal of material are inscribed. FIG. 5 shows a coated spherical surface 20 onto which the spirals 21, double or multi-spirals 22 for the local removal of material are inscribed. FIG. 6 shows a coated free-form surface 30 onto which adapted line patterns for the local removal of material are inscribed.

The exemplary methods and devices for determining residual stresses may be integrated into a coating process as described above, for example. On the basis of the determined residual stresses, the parameters of the coating process (such as cooling or heating of the substrate, application rate and temperature of the coating, layer thickness, kinematics, etc.) can be controlled in-line (i.e. during the coating process). In this way, it is possible to create coatings with high quality and low residual stresses in a fast and efficient manner.

Throughout the Figures reference numbers are used to denote same or similar elements. Moreover, a list of reference numerals and corresponding explanations are provided in Table I.

TABLE 1

| Reference numeral | Designation |
|---|---|
| | List of Reference Numerals with Designations |
| 1 | laser exposure system (exposure arrangement) |
| 1.1 | pulsed laser |
| 1.2 | laser pulses |
| 1.3 | lens |
| 1.4 | rotating wedge plate |
| 1.5 | mirror |
| 1.6 | spatial light modulator (SLM) |
| 2 | optical measuring system for determining the surface deformations (e.g. on the basis of digital holography) |
| 2.1 | laser |
| 2.2 | first beam splitter |
| 2.3 | lens for coupling light into a fiber |
| 2.4 | optical monomode fiber |
| 2.5 | small hole for fiber |

TABLE 1-continued

List of Reference Numerals with Designations

| Reference numeral | Designation |
|---|---|
| 2.6 | reference beam of rays |
| 2.7 | detector (CCD or CMOS) |
| 2.8 | second beam splitter |
| 2.9 | imaging lens |
| 2.10 | aperture stop |
| 3 | color splitter |
| 4.1 to 4.4 | partial light beam of rays for object illumination for deformation measurement |
| 5 | coated object |
| 6 | coating |
| 7 | laser-drilled hole on the coated object |
| 7.1 | laser-drilled circular hole on the coated object |
| 7.2 | laser-drilled ring on the coated object |
| 7.3 | laser-drilled patterns on the coated object |
| 8 | surface of the object 5 or 3D deformation of the surface of the object 5 |
| 9 | optical 3D measuring arrangement for 3D measurement or detection of the surface of the object |
| 10 | pulsed laser with two wavelengths, $\lambda_1$ and $\lambda_2$ |
| 11 | color splitter |
| 12 | mirror |
| 13 | optical system for laser exposure system (without laser) (as part of the scanning device) |
| 14 | measuring system for digital holography (without laser) |
| 15 | cylindrical surface |
| 16 | line pattern (radial) |
| 17 | line pattern (axial) |
| 18 | cross pattern |
| 19 | ring-shaped pattern |
| 16.a | multi-line pattern (radial) |
| 17.a | multi-line pattern (axial) |
| 18.a | multi-cross pattern |
| 19.a | multi-ellipse-pattern or multi-ring pattern |
| 20 | spherical surface |
| 21 | spiral on spherical surface |
| 21.a | double spiral on spherical surface |
| 30 | free-form surface |
| 31 | adapted patterns (adjusted) |

We claim:

1. A method for determining residual stresses of an object comprising:
    applying, by a laser exposure system, laser light to a surface of the object;
    creating a pattern of holes or a pattern of locally heated points in the object;
    after applying the laser light to the object, using an optical deformation measurement to determine one or more surface deformations;
    determining, based on the one or more surface deformations, one or more residual stresses in the object; and
    adapting a shape of the pattern of holes or of the pattern of locally heated points to at least one of: a topography of the surface of the object, the determined one or more residual stresses, or a gradient of the one or more residual stresses in the object.

2. The method of claim 1, wherein the pattern of holes or the pattern of locally heated points is generated sequentially or in parallel.

3. The method of claim 1, further comprising:
    adapting a geometry of individual holes of the pattern of holes or the pattern of locally heated points to at least one of a topography of the surface of the object, the determined one or more residual stresses, or a gradient of the one or more residual stresses in the object.

4. The method of claim 1, wherein the pattern of holes or the pattern of locally heated points comprises at least one of:
    a plurality of lines at least approximately perpendicular to a direction of a largest local curvature of the surface of the object,
    at least one spiral, wherein the center of the spiral is positioned at location of the largest local curvature of the surface of the object,
    a circle positioned at the location of the largest local curvature of the surface of the object, or
    a plurality of concentric circles positioned at the location of the largest local curvature of the surface of the object.

5. The method of claim 1, wherein the pattern of holes or the pattern of locally heated points comprise at least one of a line, a line grid, a matrix, a rosette, a slit, or a cross.

6. The method of claim 1, wherein creating the pattern of holes or the pattern of locally heated points in the object further comprises:
    generating, by a controllable spatial light modulator, the pattern of holes or the pattern of locally heated points in real time.

7. The method of claim 1, further comprising:
    obtaining data relating to at least one of a geometry of individual holes or the pattern of holes on the surface of the object or the pattern of locally heated points, a spatial position of the individual holes or the pattern of holes or the pattern of locally heated points, a topography of the pattern of holes or the pattern of locally heated points, a positioning of the pattern of holes or the pattern of locally heated points, a shape of the object, or a shape of the surface of the object.

8. A device for determining residual stresses of an object, the device comprising:
    a laser exposure system comprising:
        at least a first laser; and
        an optical scanning device to apply laser light to a surface of the object and to generate a pattern of holes or a pattern of locally heated points in the object, wherein the optical scanning device comprises:
            an optical deflection and/or modulation arrangement to controllably modulate the laser light; or
            a focusing arrangement to controllably focus the laser light; and
    an optical measuring system that determines a deformation of the surface of the object, wherein the optical scanning device is further programmed and adapted to:
        adapt a shape of the pattern of holes or of the pattern of locally heated points to at least one of a topography of the surface of the object, one or more residual stresses in the object, or a gradient of the one or more residual stresses in the object; or
        adapt a position of the pattern of holes or of the locally heated points to at least one of a topography of the surface of the object, the determined one or more residual stresses, or a gradient of the one or more residual stresses in the object.

9. The device of claim 8, wherein the optical scanning device is further programmed and adapted to:
    generate the pattern of holes or the pattern of locally heated points, sequentially or in parallel.

10. The device of claim 8, wherein the optical scanning device is further programmed and adapted to:
    vary a geometry of at least one of the holes of the generated pattern of holes or the locally heated points of the generated pattern of locally heated points, a shape of the generated pattern of holes or of the locally heated points, or a position of the generated pattern of holes or of the locally heated points; and adapt the geometry to at least one of a topography of the surface of the object, the determined residual stresses, or gradients of the residual stresses in the object.

11. The device of claim 8, wherein the optical scanning device is further programmed and adapted to generate at least one of:

a pattern with a plurality of lines, wherein the plurality of lines are at least approximately perpendicular to a direction of the largest local curvature of the surface of the object, a pattern comprising at least one spiral, a circle, or a plurality of concentric circles, wherein the center of the spiral, the center of the circle, or the center of the concentric circles is positioned at a location of the largest local curvature of the surface of the object, or a pattern comprising at least one of a line, a line grid, a rosette, a matrix, a slit, or a cross.

12. The device of claim 8, further comprising:

an optical 3D measuring arrangement that is programmed and adapted to obtain three-dimensional data relating to at least one of a geometry of individual holes, a geometry of the pattern of holes or the pattern of locally heated points, a spatial position of the individual holes, a spatial position of the pattern of holes or the pattern of locally heated points, a topography of the pattern of holes or the pattern of locally heated points, a positioning of the pattern of holes on the surface of the object or the pattern of locally heated points, a shape of the object, or a shape of the surface of the object.

13. The device of claim 8, wherein the optical modulation arrangement further comprises:

a controllable light modulator, wherein the controllable light modulator comprises at least one of a liquid crystal light modulator, a DMD light modulator, or an acousto-optical modulator; or a rotating wedge plate.

14. The method of claim 1, wherein the creating the at least one of the hole, the pattern of holes, or the pattern of locally heated points in the object is performed by an optical scanning device, wherein the optical scanning device comprises:

an optical deflection and/or modulation arrangement to controllably modulate the laser light; or a focusing arrangement to controllably focus the laser light.

15. The method of claim 1, wherein creating the pattern of holes or the pattern of locally heated points in the object further comprises:

generating, by a laser device, the pattern of holes or the pattern of locally heated points, wherein the laser device is also used to determine the surface deformations.

16. A method for determining residual stresses of an object comprising:

applying, by a laser exposure system, laser light to a surface of the object;

creating a pattern of holes or a pattern of locally heated points in the object;

after applying the laser light to the object, using an optical deformation measurement to determine one or more surface deformations;

determining, based on the one or more surface deformations, one or more residual stresses in the object; and adapting a position of the pattern of holes or of the locally heated points to at least one of a topography of the surface of the object, the determined one or more residual stresses, or a gradient of the one or more residual stresses in the object.

* * * * *